3,819,713
PRODUCTION OF ALKENONES

Horst Pommer, Ludwigshafen, Herbert Mueller, Frankenthal and Hermann Overwien, Ludwigshafen, Germany, assignors to Badische Anilin- & Soda-Fabrik Aktiengesellschaft, Ludwigshafen (Rhine), Germany
No Drawing. Continuation-in-part of abandoned application Ser. No. 660,195, Aug. 14, 1967. This application Apr. 13, 1970, Ser. No. 28,080
Int. Cl. C07c 49/20
U.S. Cl. 260—593 R          5 Claims

ABSTRACT OF THE DISCLOSURE

Alkenones whose olefinic double bond is in the $\delta,\epsilon$-position or $\gamma,\delta$-position to the keto group, are prepared by reaction of an olefin with a $\beta$-hydroxyketone in the liquid phase or in a single reaction stage by reaction of an olefin with formaldehyde or a compound yielding formaldehyde and an aliphatic ketone in the liquid phase. Alkenones are intermediates for the production of perfumes and vitamins.

---

This application is a continuation-in-part of our application Ser. No. 660,195, filed Aug. 14, 1967, now abandoned.

The invention relates to a new method for the production of alkenones of the general formulae Ia and Ib $$CHR^1=CR^2-CHR^3-CH_2-CHR^4-CO-CH_2R^5 \quad (Ia)$$
$$CH_2R^1-CR^2=CR^3-CH_2-CHR^4-CO-CH_2R^5 \quad (Ib)$$

where each of the $R^1$ to $R^5$ substituents denotes hydrogen or alkyl of 1 to 4 carbon atoms.

It is known that butanol-(1)-one-(3) can be prepared by reaction of acetone with formaldehyde. Moreover the addition of isobutylene to formaldehyde to form 2-methylbuten-(1)-ol-(4) is known. It is further known that 2-methylheptanol-(2)-one-(6) can be prepared from 3-methylbuten-(1)-ol-(3) and acetone at elevated temperatures using peroxide catalysts.

$\delta,\epsilon$-unsaturated ketones of the type Ia have been prepared by addition of olefins having the structure

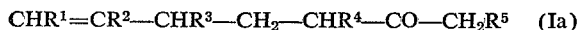

to $\alpha,\beta$-unsaturated ketones of the type

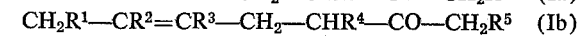

but this method is uneconomical because it requires the preparation of the unsaturated ketones (German Patent 973,089), which have to be synthesized, inter alia, from ketones

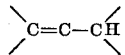

and formaldehyde at elevated temperatures in the vapor phase in the presence of dehydration catalysts (French Pat. 870,204).

Finally methylene addition according to Carrol is known by which for example 2-methylhepten-(2)-one-(6) is obtained from 3-methylbuten-(1)-ol-(3) and acetoacetic ester at 150° to 250° C. in the presence of alkaline catalysts.

It is an object of this invention to provide a simple method of producing alkenones Ia and Ib in which inexpensive starting materials are used, in which the use of catalysts is not necessary and which may be carried out not only batchwise but also continuously. It is a further object of the invention to provide a method for the production of alkenones starting from a ketone, formaldehyde and an olefin which is carried out in a single stage.

These and other objects are achieved by reaction of an olefin of the general formula II $$CH_2R^1-CR^2=CHR^3 \quad (II)$$

with (a) a $\beta$-hydroxyketone having the general formula III $$HOCH_2-CHR^4-CO-CH_2R^5 \quad (III)$$

or (b) a ketone of the general formula IV $$CH_2R^4-CO-CH_2-R^5 \quad (IV)$$

and formaldehyde or a compound yielding formaldehyde at a temperature of from 100 to 400° C. and under the autogenous pressure up to about 1,000 atmospheres gauge in the liquid phase.

When isobutylene is reacted with (a) butanol-(4)-one-(2)-or
(b) formaldehyde and acetone, methylheptenone is obtained according to the equation:

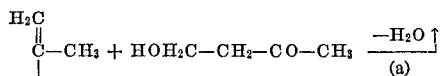

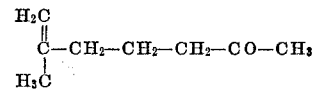

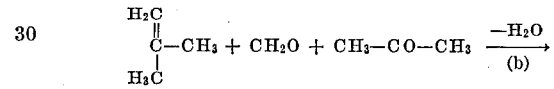

in addition to

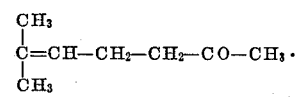

The relative proportions in which the two isomers are formed depend on the reaction conditions. At high temperatures major amounts of heptene-(2) compounds are formed, although the formation of primary olefin is always favored.

Of the olefins having the formula:

$$R^1CH_2-CR^2=CHR^3$$

those are particularly suitable which have 3 to 12 carbon atoms. Methyl is preferred as the alkyl substituent $R^1$, $R^2$ or $R^3$. Examples of suitable olefins are propylene, butene-(2), hexenes, octenes and particularly isobutylene and 2-methylbutene-(2).

It is also possible to produce the olefin during the reaction by dehydration of the appropriate alcohol. If the alcohol is thermally dehydrated under the reaction conditions, as is the case with tertiary alcohols, the use of dehydration catalysts may be dispensed with. In many cases it is however advantageous to use conventional dehydration catalysts, e.g. aluminum oxide, silica gel, Lewis acids, mineral acids and phosphates of metals of Group II of the Periodic System.

Suitable alcohols include propanol-(2), butanols, hexanols and particularly tertiary alcohols, such as tert-butanol.

Preferred $\beta$-hydroxyketones of formula III are those having from 4 to 10 carbon atoms, such as pentanol-(1)-one-(3), pentanol-(4)-one-(2), hexanol-(4)-one-(2) and particularly butanol-(4)-one-(2). Preferred substituents $R^4$ and $R^5$ are hydrogen and the methyl group.

Formaldehyde or a compound yielding formaldehyde is used as the reaction component in method (b). Hydrates, acetals, oligomers and polymers of formaldehyde may be used. An aqueous solution of formaldehyde is often employed. Examples of other compounds are trioxane, paraformaldehyde, hydrated polyformaldehyde and polyformaldehydes whose terminal hydroxyl groups have been etherified or esterified. The polymers have the general formula:

$$(CH_2O)_n$$

in which $n$ in general denotes one of the integers from 3 to 100, particularly from 3 to 20. The polymers may be cyclic ($n$ preferably being 3 or 4) or open-chain in constitution and the chain ends of the polymer molecule are usually satisfied by the grouping H . . . OH, H . . . OR or H . . . OCOR, R being usually a lower alkyl radical having one to four carbon atoms.

Examples of preferred ketones of formula IV are those having 3 to 12 carbon atoms. The preferred alkyl radical for $R^4$ or $R^5$ is the methyl group. Acetone, butanone and diethylketone are very well suited.

The olefin of formula II and the $\beta$-hydroxyketone of formula III are usually employed in the molar ratio of from 0.1:1 to 10:1, preferably from 0.2:1 to 5:1.

The components (a) olefin of formula II, (b) formaldehyde or an equivalent amount of a compound yielding formaldehyde and (c) ketone of formula IV are in general used in the molar ratio of from 10:0.1:1 to 0.02:02:1, particularly from 2:02:1 to 0.2:0.2:1. The ratio of ketone to olefin is not critical. The reactants may be used with similar success in equimolar or nonequimolar amounts and it is immaterial which of the reactants is used in excess. As regards the amount of formaldehyde, the best results are usually obtained if the equimolar amount is not exceeded.

The reaction is carreid out in the liquid phase at elevated temperature, generally in the temperature range from 100° to 400° C., particularly from 200° to 350° C., preferably from 200° to 280° C. The reaction may be carried out at atmospheric pressure, but it is preferable to use superatmospheric pressure, for example the vapor pressure of the reactants at the reaction temperature, for example up to 1,000 atmospheres gauge, particularly from 50 to 500 atmospheres gauge.

The residence time may vary within wide limits and is highly dependent on the reaction temperature, the pressure and the molar ratio used. Residence times of from ten to one thousand minutes are preferred.

The reaction may be carried out without solvents, but it is preferred to use solvents or diluents, such as saturated aliphatic or aromatic hydrocarbons, alcohols, ethers or water. Examples of suitable solvents are hexane, octane, benzene, toluene, diethyl ether, tetrahydrofuran, dioxane, methanol and propanol or the reaction components. Mixtures of solvents may also be used. The solvents or diluents are in general used in 0.1 to 10 times the weight of the reactants.

When water is used as the solvent, the preferred pH value is from 5 to 8; appropriate amounts of inert buffer substances are advantageously added to keep a specific pH value constant during the whole reaction period.

Since polymers of formaldehyde (trioxane, paraformaldehyde, polyformaldehyde) sometimes react more slowly than free formaldehyde, it is sometimes advantageous to use a small amount of a catalyst which catalyzes the depolymerization of the polymers. Aliphatic halohydrocarbons, such as methylene chloride, chloroform or carbon tetrachloride are particularly suitable substances for this purpose. The catalyst is used in general in an amount of 5 to 50% by weight, based on the aldehyde polymer.

The reaction may be carried out batchwise or continuously. Working up of the reaction mixture is carried out in the conventional way by physical or chemical separation methods. The reaction mixture is usually distilled, the unreacted starting material being recovered and if desired returned to the reaction.

The alkenones Ia and Ib obtained are valuable intermediates for organic synthesis, particularly for the production of perfumes and vitamins. Methylheptenones, for example, are starting materials for the synthesis of pseudoionone and vitamin A.

The invention is illustrated by the following Examples in which the parts specified are parts by weight unless otherwise stated.

EXAMPLE 1

An autoclave filled with V2A packing material and having a useful capacity of two liters is charged continuously at 280° C. and 200 atmospheres gauge with a mixture of 600 parts of butanol-(4)-one(2) (technical grade; purity 70%) and 600 parts of isobutylene per hour. The reaction mixture obtained every hour is distilled and the following fractions are obtained on an average:

400 parts of unreacted isobutylene
200 parts of volatile cracked products (acetone and water)
250 parts of a methylheptenone mixture, b.p. 100 to 105° C. (100 mm.), consisting essentially of 2-methylhepten-(1)-one-(6)
135 parts of higher-boiling products, b.p. 100 to 150° C. (91 mm.)
200 parts residue.

EXAMPLE 2

A mixture of 200 parts of butanol-(4)-one-(2) (technical grade; purity 70%) and 250 parts of isobutylene is heated in an autoclave for two hours at 270° C. the contents of the vessel are rapidly cooled and worked up by distillation and the unreacted isobutylene is evaporated. 222 parts of residue is obtained which on fractional distillation yields 107 parts of 2-methylhepten-(1)-one-(6).

EXAMPLE 3

A mixture of 118 parts of acetone, 118 parts of isobutylene and 100 parts of 40% by weight aqueous formaldehyde solution is heated in an autoclave at 250° C. for three hours. The contents of the autoclave are then cooled rapidly and worked up by distillation. The following fractions are obtained:

86 parts of isobutylene
100 parts of acetone
20 parts of 2-methylhepten-(1)-one-(6)
10 parts of a fraction of the boiling range 80° to 100° C. (15 mm.) and
30 parts of residue.

EXAMPLE 4

An autoclave provided with an overflow and having a useful capacity of 2.5 parts by volume is charged per hour at 280° C. and at 200 atmospheres gauge with a mixture of 685 parts of acetone, 590 parts of isobutylene and 183 parts of 37% by weight aqueous formaldehyde solution. The reaction mixture obtained in the course of twelve hours is distilled. 5,600 parts of isobutylene and 7,050 parts of acetone are recovered. The aqueous phase of the remaining mixture is separated and the organic phase is distilled under subatmospheric pressure. 2,600 parts of distillate having a boiling point of 60° to 100° C. at 100 mm. is obtained which contains 75% of 2-methylhepten-(1)-one-(6) and 2-methylhepten-(2)-one-(6), and 300 parts of residue.

EXAMPLE 5

A mixture of 200 parts of acetone, 50 parts of trioxane and 177 parts of isobutylene is heated in a stirred autoclave for one hour at 290° C. The contents of the autoclave are cooled rapidly and worked up by distillation. The following fractions are obtained:

130 parts of isobutylene
84 parts of acetone
30 parts of a mixture of trioxane and water
86 parts of 2-methylhepten-(1)-one-(6), b.p. 69° to 70° C. (20 mm.)
36 parts of a mixture of products of the boiling range 80° to 120° C. (0.2 mm.) and
56 parts of residue.

EXAMPLE 6

A mixture of 200 parts of acetone, 50 parts of a mixture of formaldehyde hydrate polymers having a boiling range of 60° to 90° C. (20 mm.) and 177 parts of isobutylene is heated at 280° C. in a stirred autoclave for one hour. The contents of the autoclave are then cooled rapidly and worked up by distillation. 84 parts of 2-methylhepten-(1)-one-(6) and 17 parts of residue are obtained as well as unchanged isobutylene and acetone.

EXAMPLE 7

A mixture of 200 parts of acetone, 50 parts of formaldehyde hydrate polymer mixture having a boiling range of 90° to 130° C. (20 mm.) and 177 parts of isobutylene is heated in an autoclave for one hour at 285° C. The contents of the autoclave are then cooled and worked up by distillation. 77 parts of 2-methylhepten-(1)-one-(6) and 17 parts of residue are obtained in addition to unreacted starting materials.

EXAMPLE 8

An autoclave having a capacity of 1 part by volume is charged per hour at 300° C. and 300 atmospheres gauge with a mixture of 360 parts of acetone, 45 parts of aqueous 37% by weight formaldehyde solution and 330 parts of 2-methylbutene-(2). The reaction solution obtained is worked up by distillation. 50 parts of 2,3-dimethylhepten-(1)-one-(6) having a boiling point of 115° C. (100 mm.) is obtained from the reaction mixture obtained in one hour.

EXAMPLE 9

The procedure of Example 6 is followed but 300 parts of propylene is used instead of 2-methylbutene-(2). By working up the reaction product obtained in one hour, 60 parts of hepten-(1)-one-(6) having a boiling point of 78° to 82° C. (100 mm.) may be obtained.

EXAMPLE 10

An autoclave having a capacity of 1 part by volume is charged per hour at 300° C. and 250 atmospheres gauge with a mixture of 250 parts of methyl ethyl ketone, 35 parts of 37% by weight aqueous formaldehyde solution and 250 parts of isobutylene. The reaction solution is worked up by distillation. 50 parts of 2-methylocten-(1)-one-(6) having a boiling point of 123° C. (100 mm.) is obtained from the reaction mixture obtained per hour.

We claim:

1. A process for the production of alkenones of the formulae Ia and Ib $$CHR^1=CR^2-CHR^3-CH_2-CHR^4-CO-CH_2R^5 \quad (Ia)$$

$$CHR^1-CR^2=CR^3-CH_2-CHR^4-CO-CH_2R^5 \quad (Ib)$$

wherein each of the $R^1$ to $R^5$ substituents denotes hydrogen or alkyl of 1 to 4 carbon atoms, which process comprises reacting in a single stage liquid phase at a temperature of from 200° to 350° C. and under a pressure up to about 1,000 atmospheres gauge an olefin of the formula II $$CH_2R^1-CR^2=CHR^3 \quad (II)$$

wherein $R^1$, $R^2$ and $R^3$ have the meanings defined above, with a ketone of the formula IV $$CH_2R^4-CO-CH_2R^5 \quad (IV)$$

wherein $R^4$ and $R^5$ have the meaning defined above and also with formaldehyde as a coreactant.

2. A process as claimed in claim 1 wherein the formaldehyde coreacted with the ketone IV is supplied by a compound selected from the group consisting of a hydrate, an acetal, an oligomer and a polymer of formaldehyde.

3. A process as claimed in claim 1 wherein the olefin II, the formaldehyde and the ketone IV are used as coreactants in a molar ratio of from 10:0.1:1 to 0.02:0.2:1.

4. A process as claimed in claim 1 for producing alkenones of the formulae $$CH_2=\underset{\underset{CH_3}{|}}{C}-CH_2-CH_2-CH_2-CO-CH_3$$

and $$CH_3-C=CH-CH_2-CH_2-CO-CH_3$$
$$\underset{CH_3}{|}$$

by reacting isobutylene with acetone and formaldehyde.

5. A process as claimed in claim 4 carried out at a temperature of 200° C. to 350° C., a pressure of about 50 to 500 atmospheres gauge and a molar ratio of isbutylene:formaldehyde:acetone of from 10:0.1:1 to 0.02:0.2:1.

References Cited

UNITED STATES PATENTS

| 989,993 | 4/1911 | Merling et al. | 260—594 |
| 3,422,148 | 1/1969 | Wellner et al. | 260—593 R |
| 2,246,037 | 6/1941 | Gallagher et al. | 260—593 R |
| 2,055,456 | 9/1936 | Eichwald | 260—485 |
| 2,230,005 | 1/1941 | Moser | 260—537 |

FOREIGN PATENTS

| 973,089 | 12/1959 | Germany | 260—593 R |

OTHER REFERENCES

Walker, Formaldehyde, p. 295 (third edition) (1968).

DANIEL D. HORWITZ, Primary Examiner

UNITED STATES PATENT AND TRADEMARK OFFICE
CERTIFICATE OF CORRECTION

PATENT NO. : 3,819,713
DATED : June 25, 1974
INVENTOR(S) : Horst Pommer, et al

It is certified that error appears in the above-identified patent and that said Letters Patent are hereby corrected as shown below:

In the Heading, insert between lines 9 and 10, -- Claims priority, application Germany, May 11, 1966, B87070; July 16, 1966, B88034; August 27, 1966, B88674--

Signed and Sealed this

Twenty-fourth Day of August 1976

[SEAL]

Attest:

RUTH C. MASON
Attesting Officer

C. MARSHALL DANN
Commissioner of Patents and Trademarks